United States Patent [19]
Stern et al.

[11] Patent Number: 5,877,899
[45] Date of Patent: Mar. 2, 1999

[54] IMAGING SYSTEM AND METHOD FOR IMAGING INDICIA ON WAFER

[75] Inventors: Howard Stern, Greenlawn, N.Y.; Timothy P. White, New Boston, N.H.

[73] Assignee: Northeast Robotics LLC, Weare, N.H.

[21] Appl. No.: 854,939

[22] Filed: May 13, 1997

[51] Int. Cl.$^6$ .................................................... G02B 27/14
[52] U.S. Cl. .................... 359/633; 359/629; 250/559.02; 250/559.04; 250/559.08; 250/223 R
[58] Field of Search ..................................... 359/633, 636, 359/629; 250/578.1, 555, 556, 559.02, 559.04, 559.08, 559.39, 223 B, 223 R

[56] References Cited

U.S. PATENT DOCUMENTS

| | | | |
|---|---|---|---|
| 5,005,969 | 4/1991 | Kataoka | 359/629 |
| 5,713,661 | 2/1998 | White | 359/629 |

*Primary Examiner*—Loha Ben
*Attorney, Agent, or Firm*—Davis And Bujold

[57] ABSTRACT

An imaging system for viewing indicia on an object to be observed in which the indicia comprises a plurality of either hard and/or soft marks. The light supplied by a light source is focussed by at least one lens and supplied toward an object to be observed and the reflected light is then focussed at a focal plane. The focal plane is located adjacent or coincident with a light receiving entrance of a camera or other imaging device. When a soft mark is imaged, the light is supplied at an angle to but not along the optical axis and is focussed by the lens to from an accurate image of the light source at the focal plane. Any light which contacts the unaltered specular reflective surface of the object to be observed as well as the central area of the soft mark facilitates a true and accurate reflection of the light source at the focal plane while the altered, non-flat areas of the object to be observed at least partially scatter or disperse the supplied light. Some of the scattered and dispersed light is received by the light receiving entrance and can be focussed and observed by the camera so that the indicia can be accurately perceived by the camera using conventional techniques. When imaging a hard mark, light is supplied by the light source along the optical axis. The supplied light which illuminates the hard mark is effectively absorbed by or reflected away from the optical axis and thus appears dark while the specular areas of the object to be observed are perceived by the camera as being bright.

20 Claims, 8 Drawing Sheets

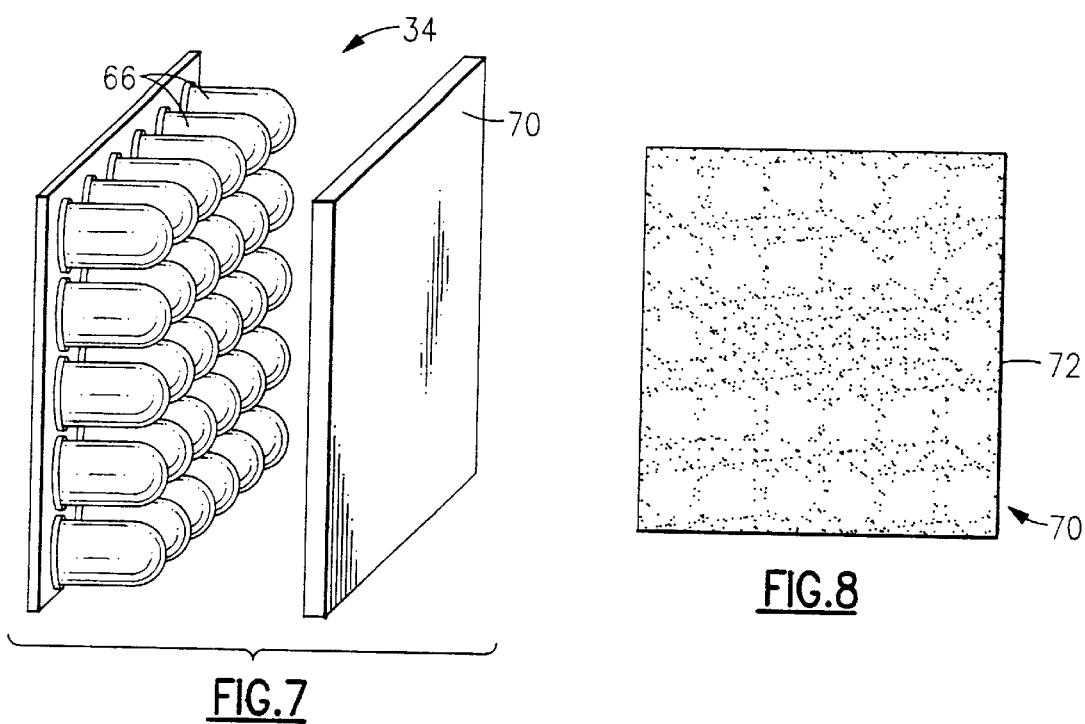
FIG.7
FIG.8
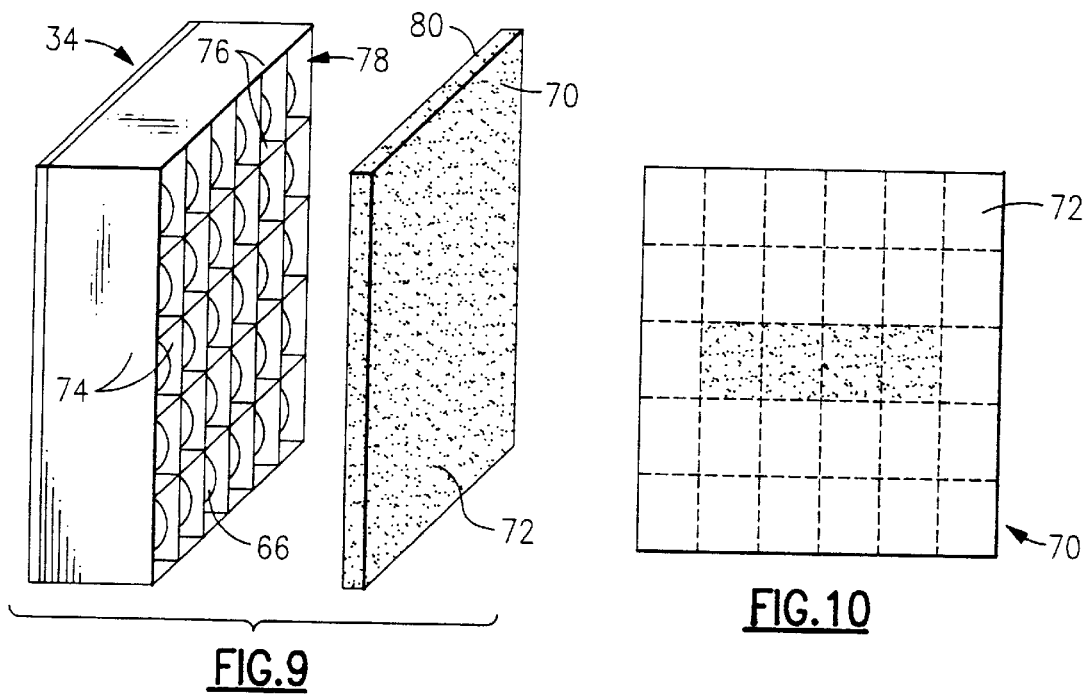
FIG.9
FIG.10

IMAGING SYSTEM AND METHOD FOR IMAGING INDICIA ON WAFER

FIELD OF THE INVENTION

This invention relates to a system and method for imaging of various indicia in a desired surface and, more particularly, to imaging of laser-etched indicia on the surface of a polished, highly specular surface, such as a semiconductor wafer.

BACKGROUND OF THE INVENTION

As can be seen in FIG. 1, a semiconductor wafer 14 generally has a highly polished flat mirror like top surface 4 which is made from silicon or some other semiconductor material. The wafer generally has a diameter 2 of between four and twelve inches. Various marking indicia are placed upon a top surface of the wafer to provide pertinent information concerning the identity, type or content of the wafer. The marking indicia is typically in the form of individual dots which comprise characters and/or symbols. Accurate reading of that information, during the wafer manufacturing process, is critical for further processing of the wafer.

Currently, an alphanumeric string or a bar code 6 is formed on a top surface 4 of the wafer 14 to identify the wafer 14. As the manufacturing cost associated with producing a wafer is very high, manufacturers wish to utilize substantially the entire surface area of the wafer to maximize production of desired electrical components. Accordingly, there is an increasing demand to place smaller and more compact indicia, e.g. a matrix code 8, on the surface of the wafer 14 which can contain as much as ten times more relevant information than a typical bar code or an alphanumeric string 6. However, due to the compact size and optical characteristics of the matrix code 8, it is much more difficult to read accurately by currently available vision systems. In an attempt to partially overcome some of the reading difficulty, the matrix code 8 contains some redundancy so that even if a minor error(s) is made in reading the matrix code 8, all of the relevant information can still be accurately deciphered by the vision system.

The marking placed on a wafer surface generally takes one of two forms, i.e. either a "hard mark" or a "soft mark". A hard mark is generally formed by a high powered laser marking process which etches an array of microscopic pits into a desired wafer surface to form a desired pattern. Upon formation of a hard mark, the material is ablated from the surface to yield a microscopic, steep edged pit. One of the drawbacks associated with a hard mark is the generation of dust and other process contaminants, upon creating the array of microscopic pits. The industry as a whole has been moving toward utilization of soft marks 10 which, as can be seen in FIG. 2, typically consist of an array of shallow, concave depressions formed in the top surface 12 of the flat semiconductor wafer 14. Soft marks are typically formed by a low powered laser marking process in which the surface is only slightly deformed to form the mark. The concave mark or depression is on the order of about 75 $\mu$m in diameter and 1 $\mu$m–3 $\mu$m in depth. Normally, the formation of a shallow, concave depression or soft mark results in displacement of the adjacent wafer surface material so as to form a slightly raised perimeter edge 16 which circumscribes the shallow, concave depression or soft mark 10. Due to their shallow depth, soft marks are substantially more difficult to image than hard marks.

The central surface area 18 of each concave depression making up the soft mark may retain a high degree of specularity, after the laser marking process, although its specularity is somewhat less than that of the surrounding undisturbed flat surface area 19 of the wafer 14. The raised perimeter edge 16, which circumscribes each formed concave depression or soft mark 10, has a tendency to scatter the supplied light in a plurality of different directions and thus is an imperfect reflector of any supplied light. The indicia and the adjacent surrounding wafer surface area therefore differ both in their geometry and their surface specularity, with each indicia forming an extremely shallow concave, slightly "dirty" mirror in the surface of a flat clean mirror. The slight physical differences, between the soft marks and the adjacent surface area, are the only features that distinguish the marking indicia from the surrounding surface area 19 of the wafer 14.

Because any process which alters the geometry of the wafer surface has the potential to result in contamination of the semiconductor wafer manufacturing process, it is desired that the indicia marking process for the semiconductor wafer results in a minimum alteration of the wafer surface. As the power and time duration of the laser beam utilized to create marking indicia increases, the geometry of the formed indicia differs more greatly than the geometry of the surrounding flat surface, thereby making them easier to image as well as more prone to contamination during the manufacturing process. Conversely, as the power and time duration of the marking laser beam are reduced in order to minimize the potential for altering the wafer surface and contaminating the manufacturing process, the geometry of the formed indicia differs only slightly from the geometry of the surrounding flat surface and the marks become correspondingly more difficult to image. It is to be noted that laser etched indicia can take a number of forms, depending upon the geometry, the time domain and the energy profile or other attributes of the laser beam used to create the indicia.

The marking indicia is typically imprinted on the semiconductor wafer very near an outer edge (FIG. 1). After laser marking, the semiconductor wafer goes through the semiconductor manufacturing process where a number of thin layers of different materials are deposited on the wafer's top surface 4 resulting in a complex circuitry of individual semiconductor dies and a change in the surface density of the wafer. While the various surface deposition layers are extremely uniform across the interior of the wafer, where the individual dies are formed, it is characteristic of the various depositions to have non-uniform boundaries near the edge of the wafer where the marking indicia are located. The various wafers can have a smooth or a highly variable broken edge and these variable surface features can be superimposed on or over the marking indicia, greatly increasing the difficulty in properly imaging them to distinguish them from the surrounding surface. The roughly formed deposition layer boundaries, described above, typically has a surface gradient or slope which extend in a direction perpendicular to an adjacent edge of the wafer, i.e. the boundary between the two layers typically extends parallel to the edge but the gradient or slope between the two layers typically extends in an opposite direction which is perpendicular to the edge.

A further problem associated with accurate imaging of a matrix code containing soft marks, is that one or more coatings 17 may be applied to the top surface 12 of the wafer 14 and such coating(s) 17 may partially or completely overlay the hard marks or the soft marks 10 comprising the matrix code 8. Such coatings 17 can be either clear or opaque but are typically shiny and cause additional problems in accurately reading the matrix code 8.

The entire marking indicia on a semiconductor wafer typically ranges in size from about 2 millimeters by 2 millimeters up to about 42 millimeters by 42 millimeters. A single wafer may exhibit both sizes of marks. An imaging system with a field-of-view large enough to image the largest mark, typically has a resolution which is too course to image the smallest mark. Therefore, a comprehensive imaging solution must include the ability to provide different fields-of-view so that all types of marking indicia can be accurately imaged.

As can be seen in FIG. 1A, an alphanumeric string 6 comprises a plurality of tiny pits created in a top surface of the wafer 14 to generate a code consisting the letter "A" and the numbers "170", i.e. "A170". FIG. 1B shows a portion of a matrix code 8 which is also formed from a plurality of tiny pits in a top surface 4 of the wafer 14 to generate a desire code.

One prior art method used to illuminate surface marking indicia in a wafer, with an optical axis lying normal to the surface being imaged, is to provide illumination almost adjacent to, but not coincident, with the optical axis. As the radius of curvature of the marking indicia increases, due to lower power laser markings, the reflection geometry of the marking indicia requires that the angle between the optical axis and the nearly coaxial light supply source be very small, e.g. on the order of one degree or so. For example, marking indicia with a surface slope of one degree from horizontal will not reflect light from an off-axis light source along the optical axis until the light source is within two degrees of the optical axis.

Because the camera is looking at a flat mirror surface, the field-of-view consists of a reflection of a solid angle around the optical axis, which includes the camera aperture, plus an adjoining area whose dimensions can be readily calculated by known techniques. Since the flat mirror surface reflects an area surrounding the optical axis which is larger than the camera lens aperture, the light source is brought very close to the optical axis. The light source, in an attempt to minimize the off-axis angle for the purpose of imaging surface marking indicia, will at some point appear reflected in the periphery of the field-of-view. As the light source is brought close enough to the optical axis so that the shallow angled surfaces of the individual marking indicia are able to reflect light back to the camera lens, thereby appearing bright on a dark background, the reflection of the light source on the adjacent flat mirror can appear so close to the marking indicia themselves that their images may overlap. In addition, as the specularity of the flat mirror surface, surrounding the marking indicia, is significantly greater than the specularity of the laser-etch reflective central curved surface of the marking indicia, the flat surface reflection of the illumination source appears much brighter in the camera's field-of-view than the individual marking indicia.

The apparent brightness of the marking indicia may be increased by increasing the intensity of the light source or by using a camera lens with a wider aperture which is capable of capturing more light. As the intensity of the light source is increased to increase the brightness of the marking indicia, a much brighter adjacent direct reflection of the light source may "bloom", due to photo-electric properties of the camera imaging array, and appear sufficiently large so as to impinge on the less bright marking indicia. Additionally, a larger aperture camera lens will reduce the depth of focus and also may cause the reflected image of the light source to be overly bright and thus appear more out-of-focus and possibly impinge on the less bright marking indicia. Therefore, the prior art methods which simply seek to bring a diffuse light source close to the optical axis are limited, by the above noted effects, in how close to the optical axis the off-axis light source can be brought. These effects set a corresponding lower limit of the angle of the surfaces of the marking indicia which may be imaged with such techniques, and hence a lower limit on the degree of disturbance of the wafer's surface which must be tolerated by the manufacturing process.

SUMMARY OF THE INVENTION

Wherefore, it is an object of the present invention to overcome the aforementioned problems and drawbacks associated with the prior art imaging systems.

Another object of the invention is to provide an inspection system which is able to inspect both hard and soft marks, formed in a surface, merely by changing the path of the light supplied for imaging the indicia.

A further object of the present invention is to create the maximum possible optical contrast between the concave specular marking indicia and the surrounding flat specular wafer surface area so as to allow such marking indicia to be imaged by a human operator, a visual inspection system or some other inspection means used in the manufacturing process of semiconductor materials.

Still another object of the invention is to eliminate the appearance of glints and reflections in the image of a semiconductor surface caused by the edges of deposition layers on the semiconductor surface which may overlay the marking indicia.

Yet another object of the invention is to minimize the associated costs in accurately reading marking indicia as well as the size of the associated inspection equipment so as to provide the required imaging system in as small a package as possible.

Another object of the invention is to minimize or eliminate the appearance of direct reflections of the light source in the camera's field-of-view, other than those emanating from the marking indicia themselves, thereby significantly enhancing the quality of the image and greatly increasing the proportion of the wafer's surface area that can be used for imaging the marking indicia.

Still further object of the invention is to provide a single imaging solution for a highly variable process which may include a wide range of fields-of-view, surface textures and marking geometries.

Yet another object of the invention is to provide a flexible illumination system which consists of a planar illumination source placed on and lying perpendicular to an optical axis such that the planar source is capable of special modulation in order to achieve a variety of illumination effects when projected on the surface being imaged.

A still further object of the invention is to provide a flexible illumination system composed of an array of discrete illumination elements, including a central illuminating element located on the optical axis of the light projection system.

A further object of the invention is to provide a fine grain programmable light valve illumination system which is composed of a plurality of closely arranged illumination elements, which are individually switchable between opaque and transparent, to create an illumination pattern corresponding to the preferred reflective geometries for the individual depressions making up the soft mark or for any other desired object to be illuminated.

Yet another object of the invention is to provide a mechanism for individually controlling both the on-axis and the off-axis illumination elements of the illumination array.

A further object of the invention is to use a projection lens to project an image of the light source toward a mirror-like surface to be imaged.

A still another object of the invention is to provide a geometric relationship between the planar light source, the projection lens and the camera lens such that the image of the light source is created at a plane which is at or near an entrance pupil or an aperture of the camera lens.

The invention relates to an imaging system for imaging a desired surface of an object to be observed, said imaging system comprising: a light source for supplying light to an object to be observed and containing indicia; first lens for focussing the light to be supplied, by said light source, toward the object to be observed; a beam splitter being located between said lens and the object to be observed for allowing a portion of said focussed light to pass therethrough and be supplied to the object to be observed and to receive light reflected by the object to be observed and reflect a portion of the reflected light toward an imaging device; a focal plane for focussing a reflected image of the light reflected by the object to be observed and said beam splitter; and said imaging device having a light receiving input, located adjacent said focal plane, for receiving only a portion of the light reflected by the object to be imaged while a remaining portion of the light focussing a reflected image of said light source at said focal plane.

The invention further relates to a method of imaging an object having at least one soft mark therein, said method comprising the steps of: supply a focussed light to a surface of said object to be observed which contains said at least one soft mark thereon; reflecting said supplied light off said surface of the object, containing said at least one soft mark, and focussing the reflected light at a focal plane; and positioning a light receiving input of an imaging device adjacent said focal plane such that only light which is imperfectly reflected and partially scattered by at least a perimeter area of said at least one soft mark enters said light receiving input and is perceived by said imaging device while a remaining portion of the supplied light is substantially perfectly reflected and forms an image of said light source at said focal plane.

These and other objects of the invention will be further understood by having reference to the attached drawings and the appended claims.

The term "off-axis", as used herein, designates light which is supplied other than along the optical axis of the system while the term "on-axis", as used herein, designates light which is supplied along the optical axis of the system.

The term "perfect reflector", as used herein, means a surface which reflects the supplied light back at substantially the same intensity as the intensity of the received light and the reflected light is reflected back at an opposite identical angle, relative to the surface being observed, to the angle of the supplied light. The term "imperfect reflector", as used herein, means a surface which reflects the supplied light back at an intensity less than the intensity of the supplied light and the reflected light is reflected back at a plurality of different directions and angles, relative to the surface being observed.

BRIEF DESCRIPTION OF THE DRAWINGS

The invention will now be described, by way of example, with reference to the accompanying drawings in which:

FIG. 7 is a diagrammatic perspective view showing a third embodiment of an array of LEDs for use in the inspection system according to the present invention, used in combination with a diffuser;

FIG. 8 is a front elevational view of the diffuser of FIG. 7 showing the appearance of one illumination combination of the light source;

FIG. 9 is a diagrammatic perspective view showing a fourth embodiment of an array of LEDs, for use in the inspection system according to the present invention, which is provided with partitioning cubicles and a diffuser;

FIG. 10 is a front elevational view of the diffuser of FIG. 9 showing the light source appearance for one illumination combination of the LEDs;

DESCRIPTION OF THE PREFERRED EMBODIMENTS

Initially, the basis concepts of the present invention will be set forth which will then be followed by a detail discussion of the invention. The reflection geometry of a semiconductor wafer surface and the marking indicia are well known in the art. Because the highly reflective wafer surface and the marking indicia differ only slightly in their reflective geometry, the present invention, like many of the prior imaging systems, seeks to exploit the different reflective geometry of the wafer surface and the marking indicia. However, the present is an improvement over the prior art as it creates an improved image contrast between the two types of features, i.e. one very flat and one only slightly concaved. When the marking indicia are imaged, they typically fill only one-quarter or less of the field-of-view of the camera which is used to image them and typically appear in a narrow horizontal strip near the middle of the image.

When the marking indicia are imaged, it is desirable to create maximum contrast in the field-of-view of the camera, e.g. to make the marking indicia appear uniquely bright with all other features in the vicinity of the marking indicia appearing dark. This simplifies imaging of the indicia and allows a simpler inspection algorithm to be used in locating the marking indicia in the image.

Figure 2:
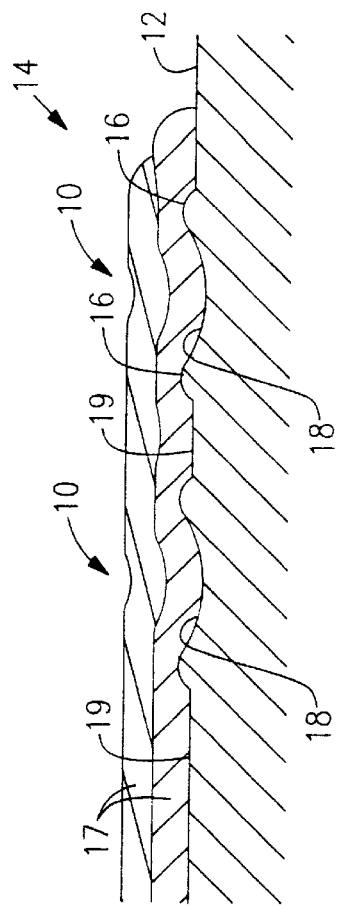
FIG. 2 is a diagrammatic partial cross-sectional view of a portion of a matrix code, similar to that shown in FIG. 1, showing the surface contours of two formed soft mark indicia.

The present invention makes use of a high quality projection lens to cause an image of the light source to be focussed at or near the plane of the entrance pupil or the aperture of an inspection device but off to the side such that light rays from the light source, which reflected off the flat mirror surface being inspected, are unable to enter the camera lens. The exact focus is not critical, but having the image of the light source miss the entrance pupil or aperture is of primary importance. This causes the entire flat mirror surface to appear dark when viewed through the lens of the camera. The central area of the formed depressions or marks, making up the marking indicia, behaves similarly to the flat mirror surface of the wafer and assists with focussing an image of the light source at or near the plane of the entrance pupil or the plane of the aperture of the inspection lens. The light rays from the light source which strike the non-flat raised perimeter edge 16 (FIG. 2), which circumscribes the shallow concave depression or marks 10 making up the marking indicia, are deviated from their normal reflective ray paths and can escape the confines of the projected image at the entrance pupil or aperture of the camera lens to enter the camera lens proper. As a result, this portion of the marking indicia appears bright on a completely dark background and the intensity of the light source can be increased without creating large bright image artifacts elsewhere in the camera image.

In order to accurately image and determine a matrix code 8 comprising a plurality of soft marks 10, two characteristics of the reflected light must be taken into consideration. First, the inventors have appreciated that the specular surface of the object to be observed 32 (FIG. 3) as well as the central area 18 of the shallow concaved depression will reflect light like a mirror so that a true and accurate image of the light source 34, at the entrance pupil plane 54 or at an aperture plane 54' of the camera, will be created. However, any area or portion of the surface 31 of the object to be observed 32, which was altered during the formation of a soft mark 10 in the surface, will deflect or scatter the supplied light in a variety of different directions. Therefore, those areas will generally not assist, or only insignificantly assist, with forming a true and accurate reflection of the light source at the focal plane 54 or 54' of the camera 56. However, some of the reflected and scattered light will be captured by the entrance pupil 54 or aperture 56 of the camera 52 and used to image the indicia 30 on the object to be observed 32.

Secondly, the semiconductor wafer may have one or more layers of a coating 17 overlying the indicia and a transition is formed between two adjacent coating layers or a coating layer and the top surface 4 of the semiconductor wafer 14. The transition creates a gradient or slope in the wafer surface which extends between the two coating layers or surfaces forming the transition. If light is supplied from a light source which extends substantially perpendicular to the direction in which the gradient or slope extends, the supplied light is reflected directly back into the camera lens causing the transition to appear bright. Such supplied and reflected light can cause unwanted light to be reflected into the entrance pupil or aperture of the camera, from each gradient or slope, thereby affecting the imaging of the indicia 30 to be observed. A further detailed discussion concerning this effect will follow concerning the description with respect to FIGS. 13–15.

Figure 3:
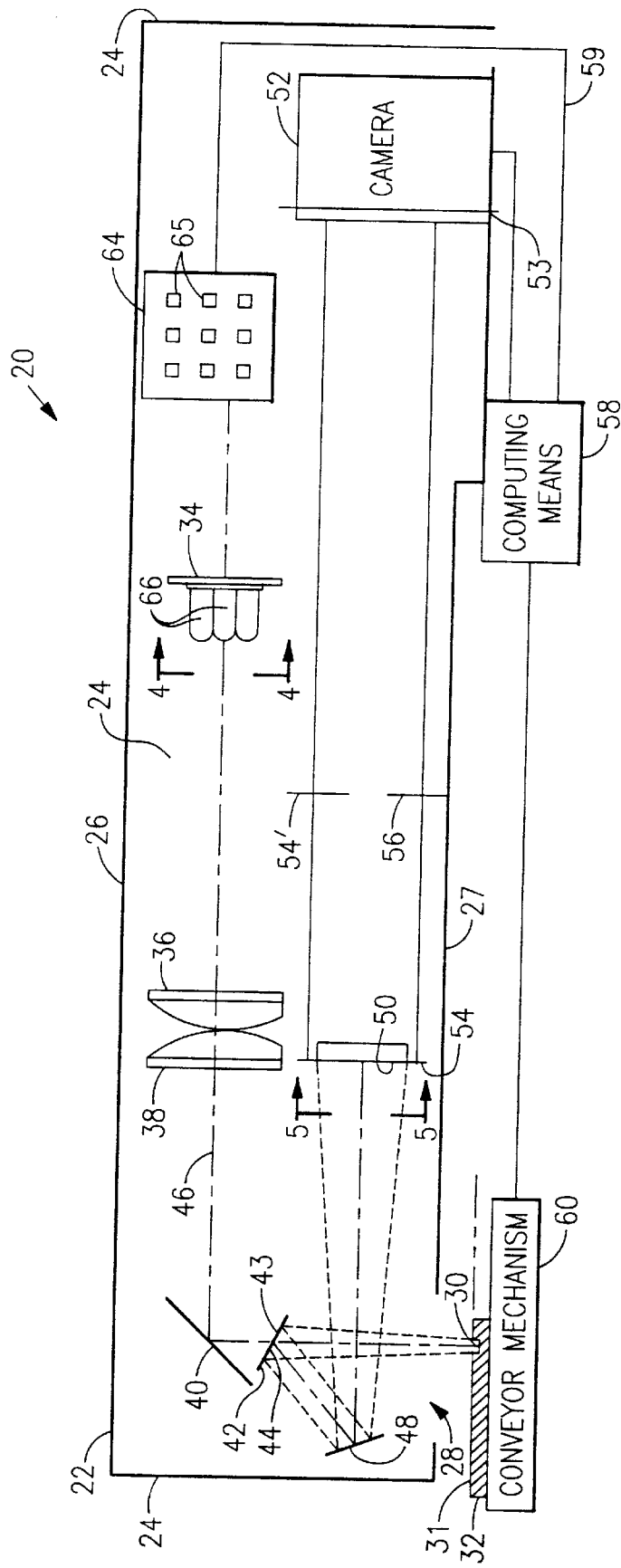
FIG. 3 is a diagrammatic representation showing the inspection system according to the present invention.

Now that a brief overview of the invention has been provided, a detailed description, concerning one embodiment of the inspection system, according to the present invention, will now be provided. As can be seen in FIG. 3, the inspection system 20, according to the present invention, comprises an exterior housing 22 which has four side walls 24 and a pair of opposed top and bottom walls 26, 27 which all define an enclosed cavity or area. The bottom wall 27 is provided with an aperture 28 therein to facilitate viewing of desired indicia 30, or some other surface marking, provided in the object to be observed 32.

A light source 34, for example a 3 by 3 array of light emitting diodes (LED) 66, is accommodated within the housing 22 adjacent one of the side walls 24. The light source 34 supplies light to at least one converging lens, and preferably a pair of adjacent lenses 36, 38, capable of projecting an accurate image at the entrance pupil plane 54. It is to be appreciated that additional lenses or other components may be utilized to improved the focused image of the supplied light at the entrance pupil plane 54. If a pair of lenses 36, 38 are utilized, they are both plano-convex lenses which are placed in an opposed relationship with respect to one another and arranged so that any aberration(s) caused by the first lens 36 is essentially canceled by the second lens 38 so that clear accurately focussed light is supplied by the pair of lenses 36, 38 to a first mirror 40. The first mirror 40 is arranged at a desired angle, e.g. a 45 degree angle with respect an optical axis 46 of the system, to reflect the focussed light at the object 32 to be observed.

The light reflected by the first mirror 40 is supplied to a beam splitter 42 arranged at a desired angle, e.g. a 67.5 degree angle with respect the optical axis 46. A first reflective surface 43 of the beam splitter 42, facing the first mirror 40, allows a portion of the supplied light, e.g. approximately half of the supplied light, to pass directly through the beam splitter 42 and illuminate the indicia 30 on the object 32 to be observed. A remaining portion of the supplied light, e.g. approximately half of the supplied light, is reflected by the first surface 43 of the beam splitter 42 away from the object to be observed 32.

The light passing through the beam splitter 42 illuminates a portion of the object to be observed 32. The supplied light is reflected back by the indicia 30 and the highly specular surface of the object 32 toward the beam splitter 42. As previously mentioned, the unaltered mirror-like surface area of the wafer as well as the central area of the soft marks reflect the supplied light substantially back along its supplied path while the areas altered during formation of the soft mark, e.g. the raised perimeter edge, reflect the supplied light back along a plurality of different angles, e.g. scatter the supplied light.

Figure 3A:
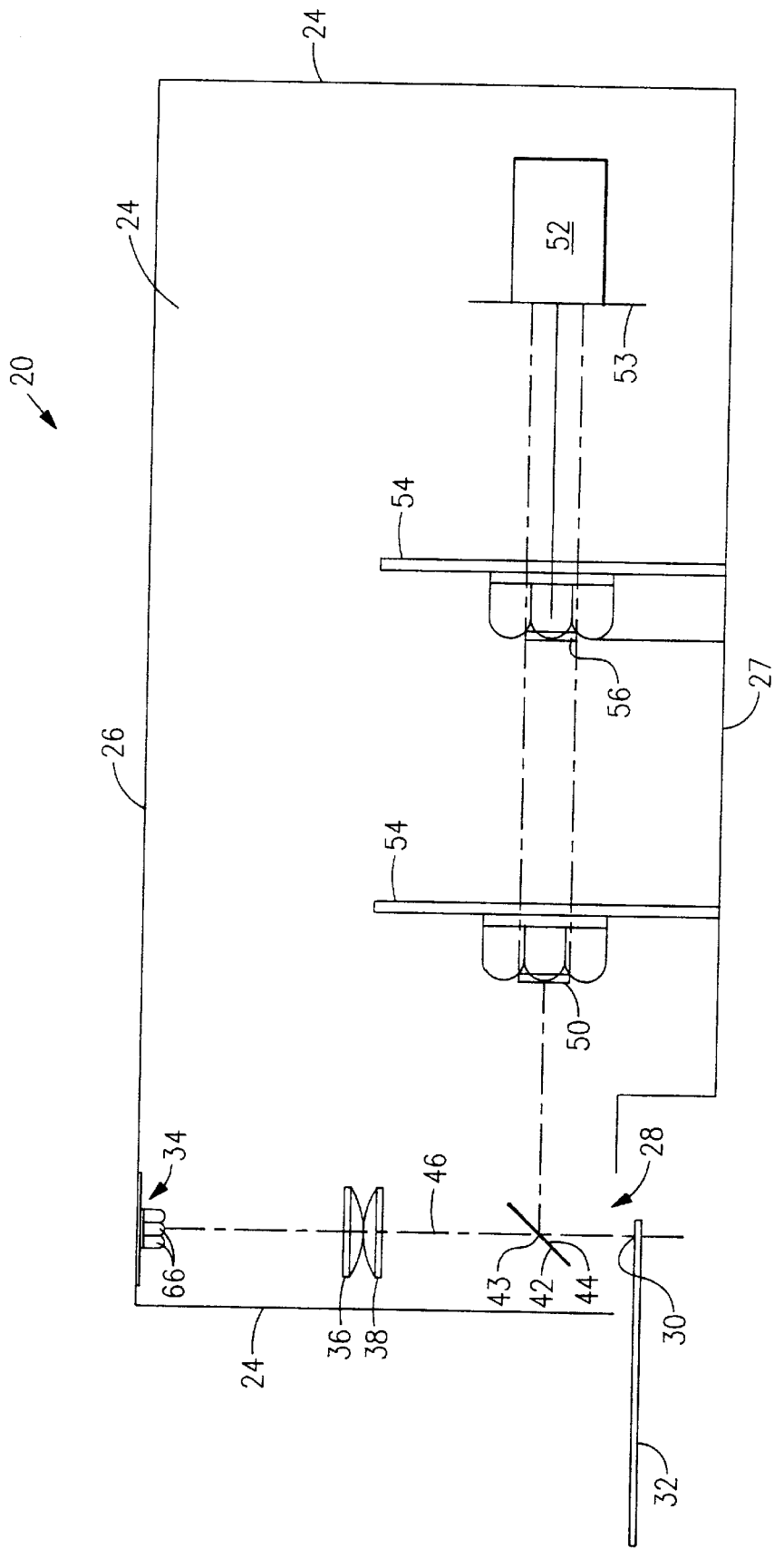
FIG. 3A is a diagrammatic representation showing the simplest form of the inspection system according to the present invention.

A second reflective surface 44 of the beam splitter 42, facing the object 32, allows a portion of the light reflected by the object 32, e.g. approximately half of the reflected light, to pass directly through the beam splitter and be reflected by the first mirror 40 back toward the light source 34 while a desired portion of the light, e.g. approximately half of the reflected light, is reflected by the beam splitter 42 toward a second mirror 48. The second mirror 48 is arranged at a desired angle, e.g. an angle of approximately 22.5 degrees with respect to the optical axis 46, so that the second mirror 48 reflects the light toward an entrance pupil 50 of a camera 52. The entrance pupil 50 or the camera aperture 56 may be located precisely at and coincident with a focal plane 54 or 54' of the illumination system 20. It is to be appreciated that the design shown in FIG. 3 incorporates two mirrors 40, 48 to facilitate a compact size of the inspection system. If the size of the inspection system is not critical, the mirrors may be eliminated so that the optical axis lies substantially perpendicular to the object to be observed 32 (FIG. 3A).

However, depending upon the application, the location of focal plane 54 can vary but a reflected image must be focussed somewhere along the optical axis. The purpose of reflecting the light by the beam splitter 42 to the second mirror 48, instead of directly at the focal plane 54, is that the second mirror 48 flips the focussed image of the light source 34 so that it is focussed right side up, instead of up side down, at the focal plane 54 or 54'. The optical axis 46 of the system is defined by the light supplied by the light source 34 through the pair of lenses 36, 38 and reflected by the first mirror 40 through the beam splitter 42 to the object 32, and the light reflected by the object 32 to the beam splitter 42 reflected toward the second mirror 48 and focussed at the entrance pupil plane 54.

By precise relative placement of the light source 34, the focussing lenses 36, 38, the beam splitter 42, the object 32, the first and second mirrors 40, 48 and the entrance pupil 50, an accurate and crisp image of the light source is focussed at the focal plane 54 located coincident with the entrance pupil 50. Alternatively, the spacing between those components can be such that an image of the light source is focussed at the focal plane 54' of the aperture 56 of the camera 52. Generally, the focussed image of the light source 34, at the focal plane 54 or 54', will be magnified, e.g. by one and one-half to three times the light source's original size.

The light which enters the entrance pupil 50 or aperture 56 is then focussed at the image plane 53 of the camera 52 (FIG. 3). The sensed image is then used to control further processing of the wafer or other component being inspected or imaged. For example, the sensed image may be conveyed to a computing means or mechanism 58 where the sensed image is used in combination with a known algorithm to determine the precise content of the matrix code or other indicia 30 on the object to be observed 32. The computing means or mechanism 58 then sends an appropriate control signal to a conveyor means or mechanism 60 which controls further manipulation or processing of the wafer or other object 32 to be observed.

As the present invention relates merely to a system for imaging indicia by a camera 52 or other observation device, and does not specifically relate to the computing means 58 and conveying means 60, a further detail discussion concerning those known features or components is not provided herein.

It is to be appreciated that the computing means 58 may be coupled to the power source and control mechanism 64, via an electrical line 59, to provide a feedback for controlling which LED or combination of LEDs are to be simultaneously illuminated. Once the camera 52 receives and supplies the sensed image to the computing means 58, the computing means is then able to determine, via conventional technology, whether the sensed image of the camera is sufficiently illuminated. If the sensed image is not sufficiently illuminated and/or if errors are detected in the image, the computing means sends a signal back to the power source and control mechanism 64, along electrical line 59, so that a different LED or combination of LEDs is illuminated and the camera 52 then receives and supplies another sensed image to the computing means 58. This feedback procedure can continue until a sufficiently clear image is detected by the computing means 58. If desired, the computing means 58 can be automatically programmed to sequentially power each LED as well as each possible combination of LEDs to determine which arrangement provides the best illumination of the indicia or other object to be observed and thereby eliminate any detection error(s), e.g see FIG. 14 for example, which may be present in the sensed image.

An important aspect of the present invention is that when the indicia comprise one or more soft marks, instead of hard marks, the light source is arranged so as not to supply any light along the optical axis but merely supply light which is slightly angled with respect to the optical axis 46, an angle less than about one degree. If the indicia comprises one or more hard marks in the surface, on the other hand, then light is supplied along the observation axis, i.e. on-axis, to accurately perceive the hard marks. The light supplied along the optical axis 46 passes through the pair of lenses 36, 38 and is reflected by first mirror 40 through beam splitter 42 and contacts a top surface of the object to be imaged. As the hard marks have a much deeper depression or pit, any light contacting the pit is effectively absorbed therein so that virtually no light is reflected by the pit back along the optical axis 46 to the camera 52. Any supplied light which contacts the unaltered surface area of the wafer is reflected by the wafer back toward the beam splitter 42 where it is reflected toward the second mirror 48 then reflected toward the camera 52 where it enters the entrance pupil 50 of the camera 52. The hard marks appear as dark areas while the unaltered mirror-like surface areas of the wafer appear bright.

It is to be appreciated that the present invention can tolerate a certain amount of "noise" when sensing an image, but the visual "noise" from the area surrounding the marking indicia to be observed must be relatively small so as to avoid imaging and software interpreting errors. Due to the reflection characteristics between the flat areas, which will accurately produce an image of the light source at the focal plane 54 or 54', and the non-flat areas which will scatter the reflected light in a plurality of different directions thereby allowing some of the stray deviated and scattered light to be received by the entrance pupil 50 or aperture 56 and be sensed by the camera 52, an accurate image of the marks or other indicia provided in the surface can be obtained. Therefore, when imaging a soft mark, only stray and deviated light from the surface to be observed 32 enters the entrance pupil 50 of the camera 52 and is sensed by the camera 52 while all of the remaining surrounding area of the object to be observed 32 reflects the supplied light such that it does not enter the camera 52. Thus those areas are perceived by the camera as being dark.

Each of the nine LEDs 66, comprising the light source 34, are individually controlled by a power source and control mechanism 64 so that each one of the LEDs 66 can be individually turned on and off, as desired, by the nine (9) separate switches 65 each electrically coupled to only one of the nine LEDs 66. A central LED is located on and is coincident with the optical axis 46 of the inspection system 20. This single centrally located LED is very useful in supplying light on-axis to facilitate illumination of hard marks.

A simplified form of the inspection system 20, according to the present invention, is shown in FIG. 3A. As shown in this Figure, the inspection system 20 comprises an exterior housing 22 which has four side walls 24 and a pair of opposed top and bottom walls 26, 27 which all define an enclosed cavity or area. The bottom wall 27 is provided with an aperture 28 therein to facilitate viewing of desired indicia 30, or some other surface marking, provided in the object to be observed 32.

A light source 34, e.g. a plurality of LEDs 66, is accommodated within the cavity of the housing 22 adjacent one of the walls, e.g. top wall 26. The light source 34 supplies light to a projection lens or lenses 36, 38 capable of projecting an accurate image at the focal plane 54 or 54'. The projection lenses 36, 38 supply clear and accurately focussed light to a beam splitter 42 arranged at a desired angle, e.g. a 45 degree angle with respect the optical axis 46. A first reflective surface 43 of the beam splitter 42, facing the projection lenses 36, 38, allows a portion of the supplied light, e.g. approximately half of the supplied light, to pass directly through the beam splitter 42 and illuminate the indicia 30 on the object 32 to be observed. A remaining portion of the supplied light, e.g. approximately half of the supplied light, is reflected by the first surface 43 of the beam splitter 42 away from the object to be observed 32.

The light passing through the beam splitter 42 illuminates a desired portion of the object to be observed 32. The supplied light is reflected back by the indicia 30 and the highly specular surface of the object 32 toward the beam splitter 42. A second reflective surface 44 of the beam splitter 42, facing the object 32, allows a portion of the light reflected by the object 32, e.g. approximately half of the reflected light, to pass directly through the beam splitter and be supplied toward the projection lenses 36, 38 while a desired portion of the light, e.g. approximately half of the reflected light, is reflected by the beam splitter 42 toward an entrance pupil 50 or a camera aperture 56 of a camera 52. As with the previous embodiment, the entrance pupil 50 or the camera aperture 56 may be located precisely at and coincident with a focal plane 54 or 54' of the illumination system 20. As no mirror is located along the optical path between the beam splitter 42 and the focal plane 54 or 54', the focussed image of the light source 34 is up side down, rather than right side up, at the focal plane 54 or 54'.

The optical axis 46 of the system is defined by the light supplied by the light source 34 through the lenses 36, 38 and the beam splitter 42 to the object 32, and the light reflected by the object 32 to the beam splitter 42 and reflected and focussed at the focal plane 54 or 54'. As with the previous embodiment, the light which enters the entrance pupil 50 or camera aperture 56 is then focussed at the image plane 53 of the camera 52 and used to control further processing of the wafer or other component being inspected or imaged.

Figure 4A:
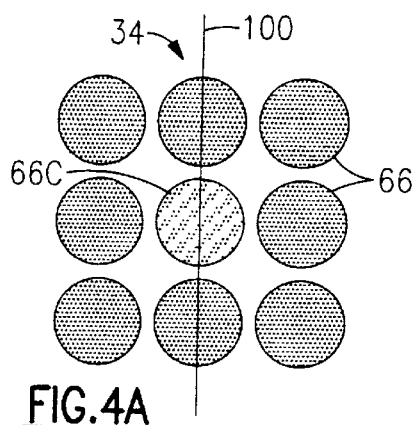
FIG. 4A is a first diagrammatic view, along section line 4—4 of FIG. 3, of the illumination light source.
Figure 5A:
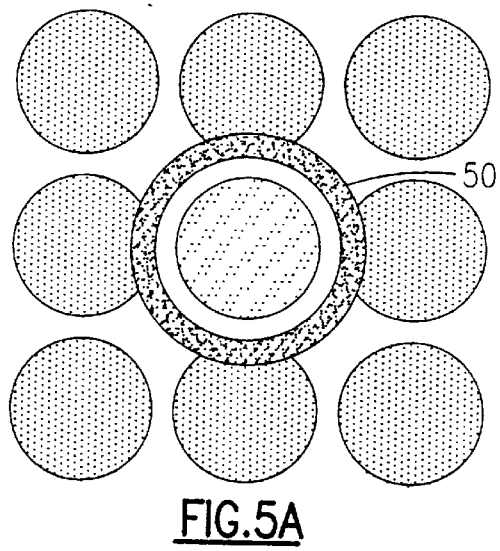
FIG. 5A is a diagrammatic view, along section line 5—5 of FIG. 3, showing the projected image of the light source of FIG. 4A at the focal plane.
Figure 4B:
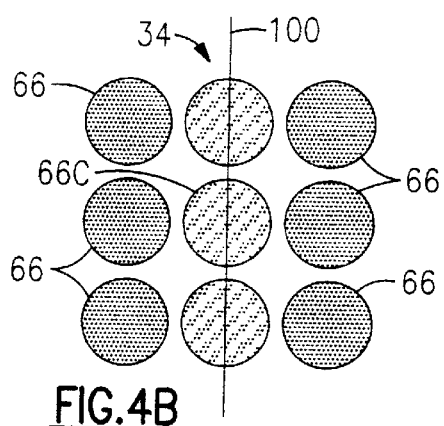
FIG. 4B is a second diagrammatic view, along section line 4—4 of FIG. 3, of the illumination light source.
Figure 4C:
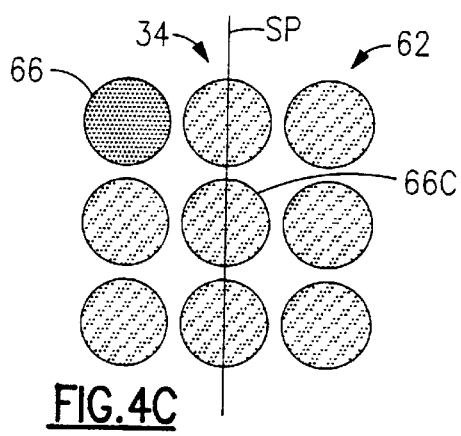
FIG. 4C is a third diagrammatic view, along section line 4—4 of FIG. 3, of the illumination light source.

As can be seen in FIGS. 4A–4C, the array of LEDs 62 can be divided into a plurality of different sections. In each of these Figures, there are nine (9) LEDs 66 arranged in the array and each LED comprises a separate section, i.e. there are nine (9) separate sections. When all of the LEDs 66, except for the centrally located LED 66C, are illuminated, the image of the light array, focussed at focal plane 54 or 54' of the camera is shown in FIG. 5A, with the entrance pupil or aperture being designated by circular element 50. As can be seen in this Figure, the reflected image of the light source 34 is greater in size than the original light source 34. This illumination combination has limited utility in that the two centrally located LEDs 66, which are illuminated and located along the sagittal plane 100, have a tendency to supply light which is reflected off any gradient or slope and received by the entrance pupil or aperture of the camera thereby leading to false readings. The sagittal plane 100, in this embodiment, is coincident with the optical axis 46 and extends perpendicular to the both top and bottom walls 26, 27 of the housing.

Figure 5B:
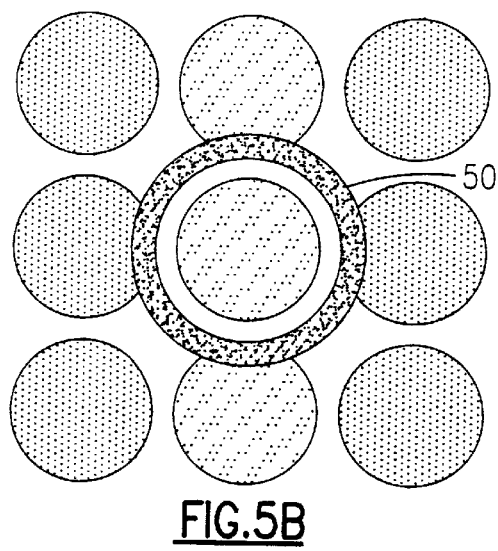
FIG. 5B is a diagrammatic view, along section line 5—5 of FIG. 3, showing the projected image of the light source of FIG. 4B at the focal plane.

FIG. 4B shows a second illumination arrangement of the light source 34, in the case of highly specular soft mark indicia, in which the six (6) outer LEDs 66 are illuminated while the three (3) centrally located LEDs 66, 66C are not powered, i.e. no light is provided by any one of the three LEDs 66, 66C which are located along the sagittal plane 100. The reflected image of this embodiment of the light source 34 can be seen in FIG. 5B. This arrangement has proven useful in imaging soft marks formed in the top surface of a wafer but, depending upon the sensitivity of the algorithm and the inspection equipment, this illumination combination may provide false readings as each soft mark may appear as a pair of soft marks, instead of a single mark.

Figure 5C:
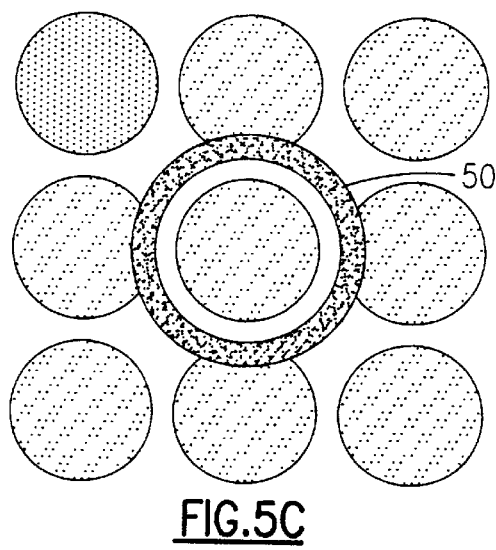
FIG. 5C is a diagrammatic view, along section line 5—5 of FIG. 3, showing the projected image of the light source of FIG. 4C at the focal plane.

FIG. 4C shows a preferred illumination arrangement of the light source 34, for illumination of highly specular soft mark indicia, in which only one (1) of the nine (9) LEDs 66, e.g. the LED located in the left hand corner of the array, is illuminated to supply light to the lenses 36, 38. The reflected image of the illumination source 34 of FIG. 4C is shown in FIG. 5C. This illumination arrangement has proven very useful in accurately imaging soft marks on a desired surface. The inventors believe that the light source, for imaging soft marks, should be concentrated in a single area or section which is supplied off-axis. It is desirable to supply light only from one or a few of the separate sections to the object to be observed 32 so that the light reflected by each soft mark indicia 30 is accurately perceived by the camera 52 as being only a single soft mark, not a plurality of marks.

The illumination embodiment shown in FIGS. 4A and 4B are symmetrical with respect to the optical axis 46 and the arrangement of FIG. 4A provides light along the sagittal plane 100. Such a lighting arrangement has a tendency to reflect light off each surface which lies or extends normal to the sagittal plane 100. The light reflected off the gradient or slope is received by the entrance pupil 50 of the camera and affects the image of the marks to be perceived. The illumination arrangement shown in FIG. 4C is asymmetrical and the asymmetrical lighting arrangement has a tendency to eliminate unwanted light of the gradient or slope from interfering with imaging of the indicia contained on the surface.

Figure 6:
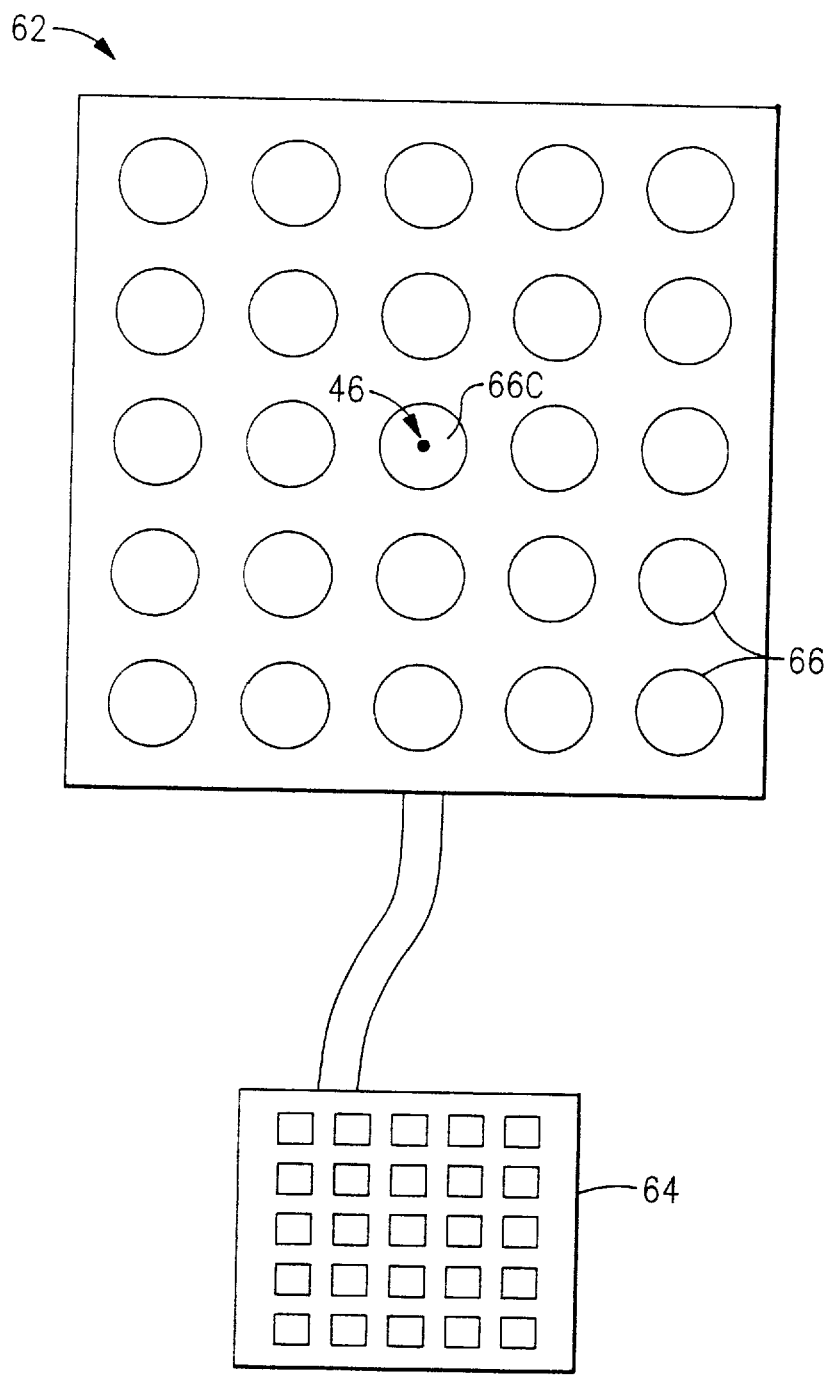
FIG. 6 is a diagrammatic view showing a second embodiment of an array of LEDs for use in the inspection system according to the present invention.
Figure 12:
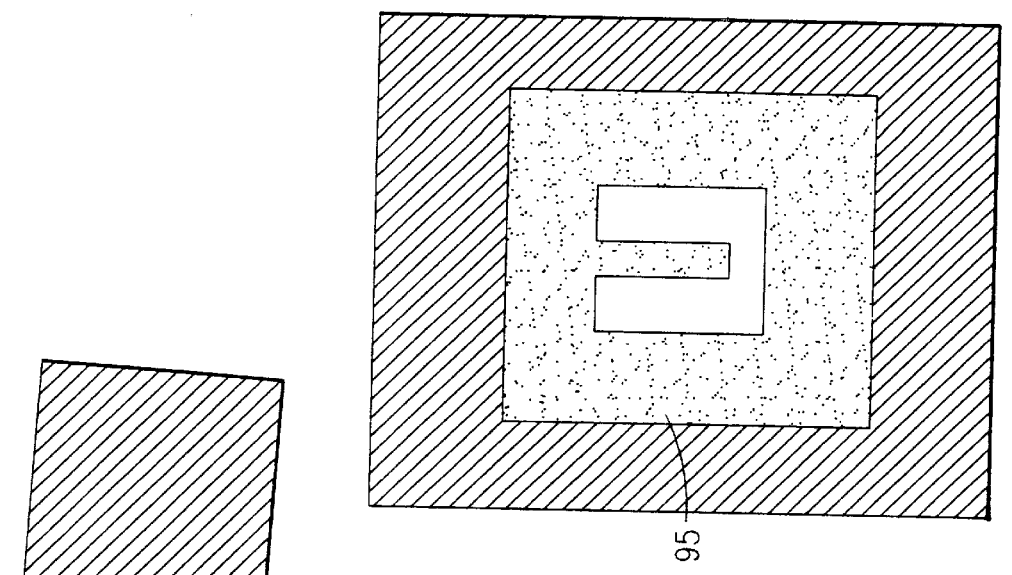
FIG. 12 is a front elevational view of the light source of FIG. 11 showing one illumination combination of the light source.

Turning now to FIG. 6, a second embodiment of an array 62 of LEDs 66 for use in the present invention, is diagrammatically shown. As can be seen in this Figure, the array comprises a light source comprising 5 LEDs by 5 LEDs 66, for example, which are each individually controlled by a power and control mechanism 64 so that each one of the LEDs 66 can be individually turned on and off as desired. The central LED 66C is located on and is coincident with the optical axis 46 of the inspection system 20. This single centrally located LED 66C is very useful in supplying light on-axis to facilitate illumination of hard marks.

The pitch of the light source array, i.e. the spacing of the LEDs 66 from one another, is selected to be as small as possible, e.g. a spacing of the center of one LED to the center of an adjacent LED is on the order of a quarter of an inch to a twentieth of an inch or so. When the LEDs are placed close to one another, they facilitate a brighter and more uniform reflected image of the light source at the focal plane 54 or 54' of the camera 56 and this assists with more accurate imaging of the indicia. The light source 34 typically has an active area size of about 1 inch by 1 inch and more preferably about one-half inch by one-half inch.

It is to be appreciated that the light source 34, according to the present invention, can vary depending upon the illumination requirements for the particular application. An important feature of the present invention is that the light source be variable so that different brightness, uniformity, resolution and appearance of the light source can be utilized to maximize viewing of the desired features or areas of the object to be observed.

If a simple LED array is used for illumination, the focussing behavior of the rounded ends of the LEDs 66 may interact with the light source projection lens to create undesirable non-uniformities in appearance from one LED 66 to another LED 66 located in the array. This undesirable optical behavior can be lessened by placing a diffuser 70 in front of the LED array, i.e. between the LEDs 66 and the light source projection lens, to eliminate the focussing behavior of each individual LED 66 and make the light field created by each LED 66 appear substantially identical to that of all other LEDs 66 contained in the array (see FIG. 8).

In addition, because of the LEDs' close proximity to one another, the LEDs 66 in the array will suffer from undesirable optical "cross-talk" where light scattered from a single LED 66 will be reflected off an adjacent or adjacent LEDs 66, thereby creating a poorly defined halo of scattered light around a central bright spot whose appearance is highly sensitive to slight variations in the orientation of the LEDs 66. This scattering of light, by adjacent LEDs 66, makes it difficult to create a well-defined pattern of illumination because any illumination pattern must be created in the form of a discontinuous pattern of poorly defined "spots" of light emanating from a front surface 72 of the diffuser 70, as can be seen in FIG. 8.

One way of minimizing the "cross-talk" between adjacent LEDs 66 is to separate the LEDs 66 from one another by a plurality of longitudinally extending opaque partition members 74 and plurality of transversely extending opaque partition members 76 which together define a plurality of separate opaque cubicles 78 which each contain a LED 66. A rear surface 80 of the diffuser abuts against a perimeter edge of the cubicles 78. As the cubicles 78 are opaque, each cubicle prevents optical "cross-talk" between the LED 66 and any adjacent cubicle 78. As a result of this, the light field emanating from each LED and appearing on a front surface 72 of the diffuser 70 is homogenized. Thus, when a pattern of LEDs 66 is illuminated by the light source 34 of FIG. 9, the resulting pattern of light on the front surface 72 of the diffuser 70, facing the projection lens, is composed of a contiguous uniformed area with sharply defined boundaries between the illuminated area and the non-illuminated area.

As can be seen in FIG. 10, only four of the centrally located LEDs 66 are illuminated and the resulting pattern of illumination is substantially continuous and rectangular in shape. Depending upon the size and the density of the LEDs 66 making up the light source 34, i.e. the spacing of the LEDs 66 from one another, a crisply defined illumination pattern of arbitrary resolution may be created.

An alternate way of eliminating the focusing by the individual lenses of the LEDs is to use LEDs with flat top lenses (no optical power) or to use specially packaged lens LED chips that are optimized for surface mounting directly to a printed circuit board. If LED chips are utilized, an intermediate focusing lens could be used to focus the light generated by each LED chip at the projection lens so as to supply virtually all of the light of the LED chip to the projection lens.

It is to be appreciated that the brightness and resolution of the light or illumination patterns created with the LEDs 66 is limited by the inherent size and electro-optical properties of the LEDs 66. A light source pattern of greater brightness and finer resolution may be achieved by a programmable liquid crystal light valve used in conjunction with a high density diffused back light. This configuration is typically known as an LCD display such as that used in a convention pocket calculator or computer projection screen.

Figure 11:
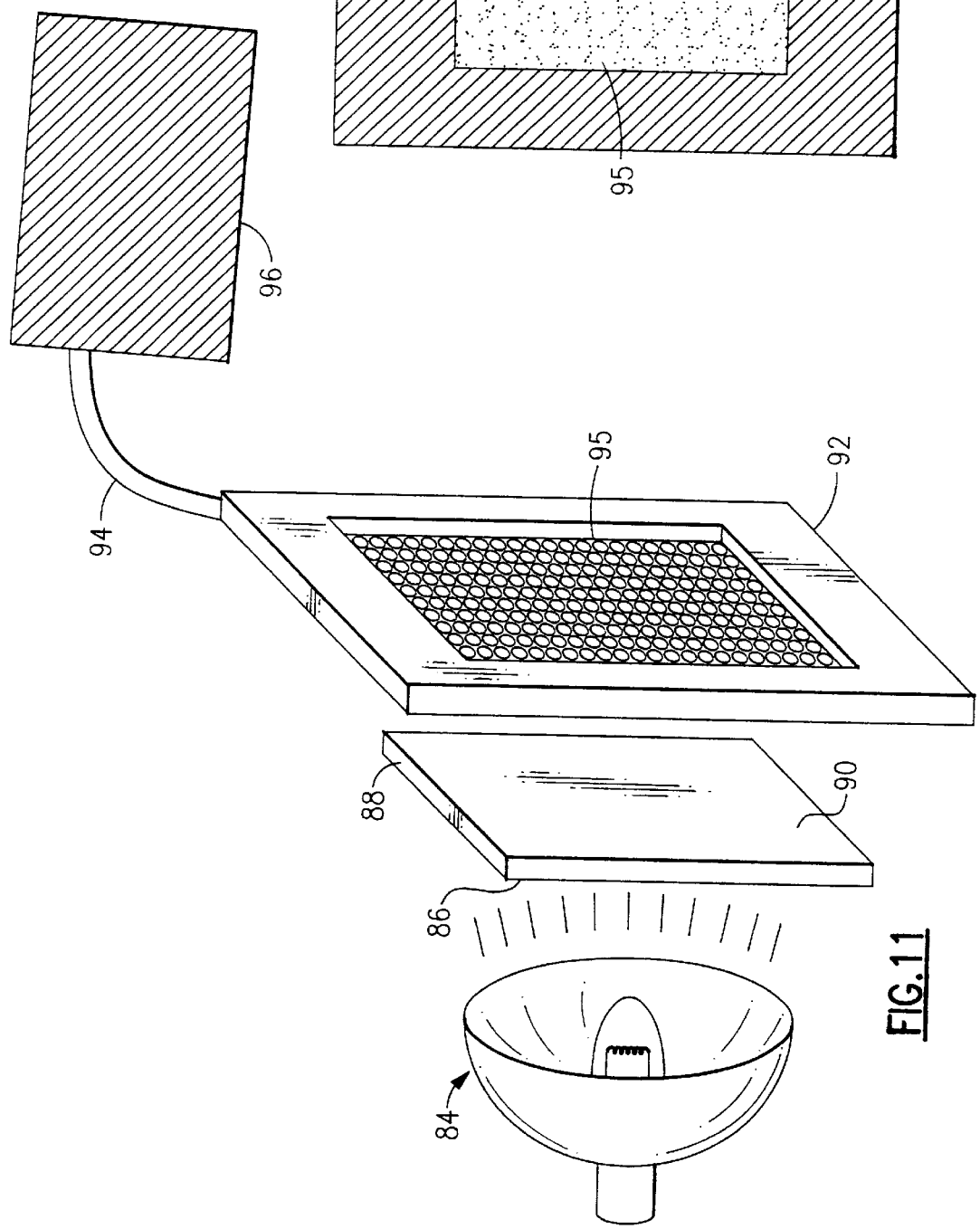
FIG. 11 is a diagrammatic perspective view showing a fifth embodiment of an illumination source for use in the inspection system according to the present invention.

FIG. 11 shows an example of a programmable LCD light valve in which a light source 84 provides light to a rear surface 86 of a diffuser 88. The diffused light emanates from the second opposed front surface 90 of the diffuser 88 and is projected at a rear surface of the programmable LCD light valve 92. The programmable LCD light valve 92 is electrically coupled, via electrical cable 94, to a light source controller 96. The function of the light source controller 96 is to communicate with the LCD light valve 92, via the electrical cable 94, to allow a desired portion of the supplied diffuse light to pass therethrough and be supplied by a first surface 95 of the programmable LCD light valve 92 to the projection lens. As the features of the programmable LCD light valve 92 and light source controller 96 are well known to those skilled in this art, a further detailed description concerning the same is not provided herein.

Figure 13:
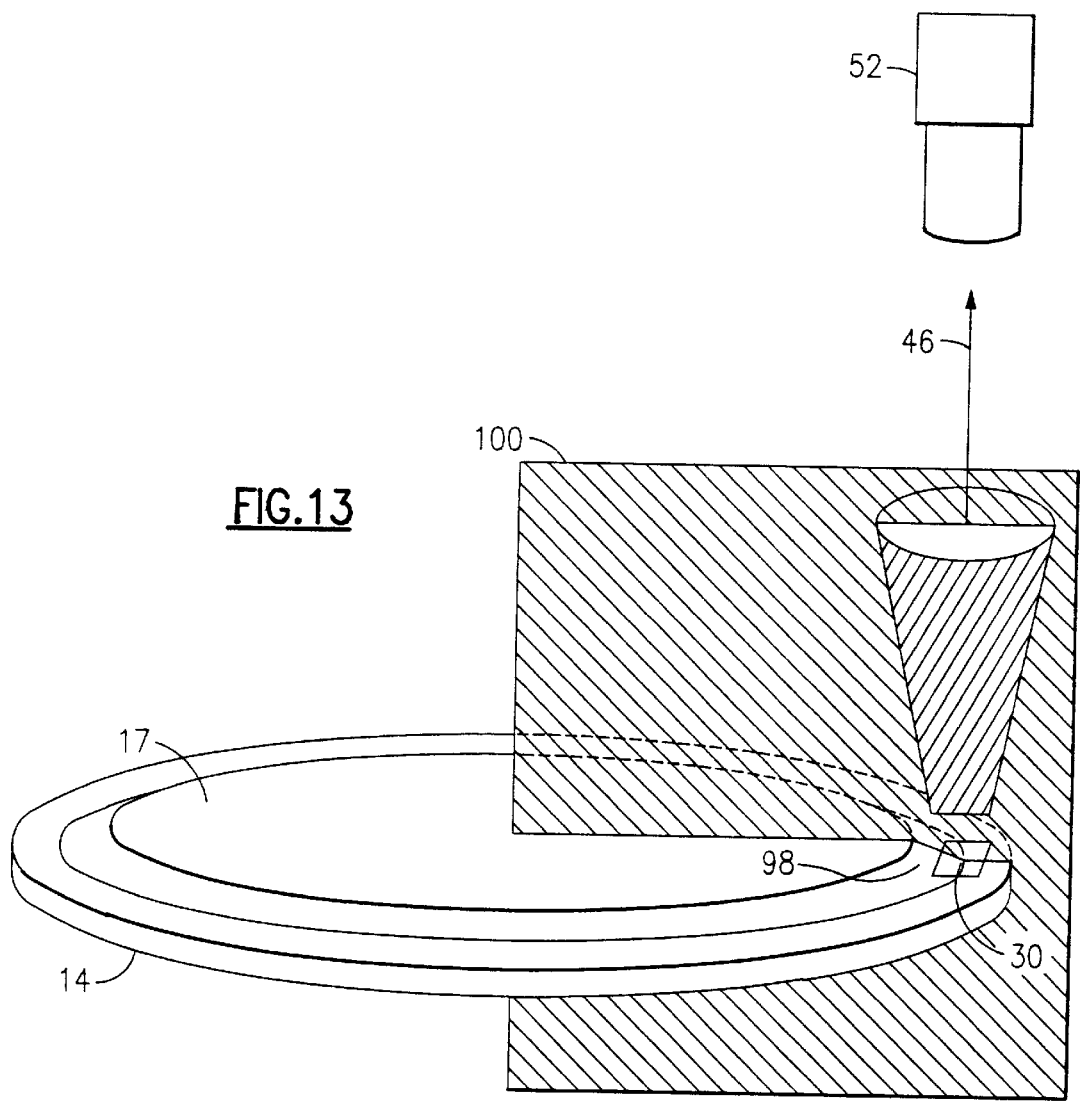
FIG. 13 is diagrammatic view showing a sagittal plane defined with respect to the wafer and the camera.
Figure 14:
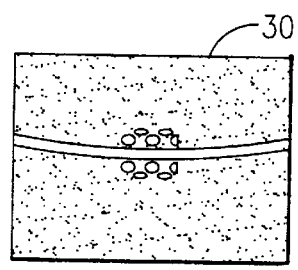
FIG. 14 is a diagrammatic top plan view of a field-of-view having illumination along the sagittal plane and reflecting a gradient or slope to the camera.
Figure 15:
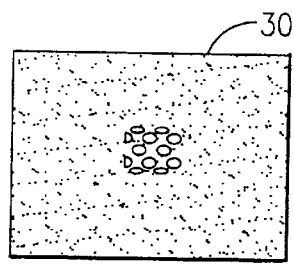
FIG. 15 is a diagrammatic top plan view, similar to FIG. 14, of a field-of-view with illumination being excluded from the sagittal plane thereby resulting in substantially no reflection from the gradient or slope.

Turning now to FIGS. 13–15, a detailed description a supply of illumination light to the indicia to prevent the gradient or slope from effecting the perceived image will now be provided. As can be seen in FIG. 13, a diagrammatic representation of the wafer 14 is shown and it has one layer of coating layer 17 deposited on a top surface thereof. The coating layer 17 is greatly exaggerated, in FIG. 13, so that the surface gradient or slope 98 of the transition is readily apparent.

The light is supplied from the light source 34 through the lenses 36, 38 and reflected off the first mirror 40 through the beam splitter 42 to the indicia 30 on the wafer 14 (FIG. 3). The pattern of illumination of the light source 34 is selected such that no light is supplied along the sagittal plane 100 extending along the optical axis 46 and parallel to and/or coincident with the gradient or slope overlying the indicia 30. The light source is properly selected so that no light is provided along the sagittal plane and preferably the light is selected so as to be an asymmetrical light source with the indicia located within the field-of-view of the camera. By this arrangement, the indicia 30 can be readily imaged without any interference from the gradient or slope 98 overlying the indicia 30. However, if the wafer 14 is turned 90°, relative to the sagittal plane 100, so that the gradient or slope 98 lies essentially perpendicular to the sagittal plane 100, light is reflected by the gradient or slope 98 and received by the light receiving input, e.g. the entrance pupil 50 or aperture 56 of the camera 52, and perceived within the camera's field-of-view. An image of indicia 30 containing a gradient or slope 98 is shown in FIG. 14 and the gradient or slope 98 renders it very difficult to read a portion of the indicia 30 on the wafer 14. If the gradient or slope lies or extends parallel to and/or coincident with the sagittal plane 100, the image of the gradient or slope 98 is not perceived by the camera 52 and it is very easy to accurately image the indicia 30, as can be seen in FIG. 15.

Figure 1B:
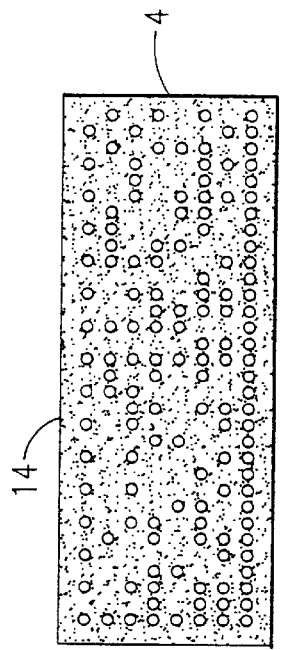
FIG. 1B is a diagrammatic plan view of a matrix code formed in a partially shown semiconductor wafer.
Figure 1:
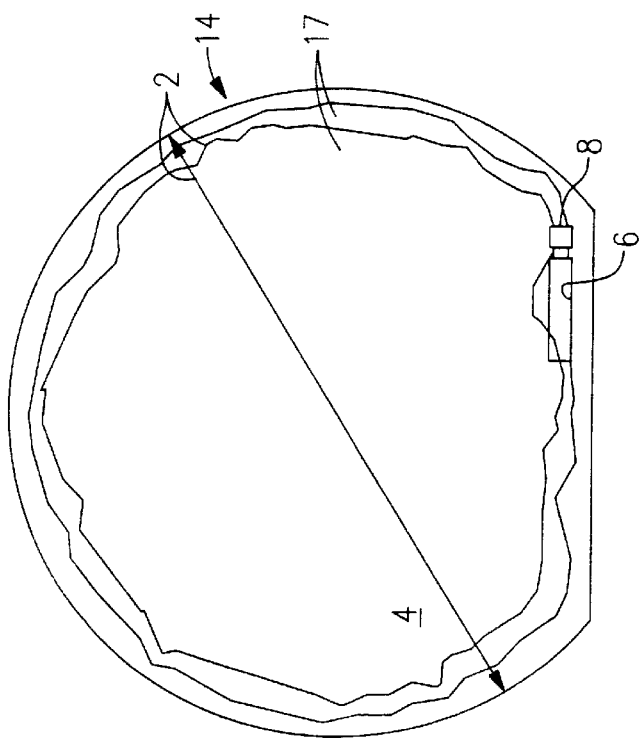
FIG. 1 is a diagrammatic plan view of a semiconductor wafer having both an alphanumeric string and a matrix code formed thereon.
Figure 1A:
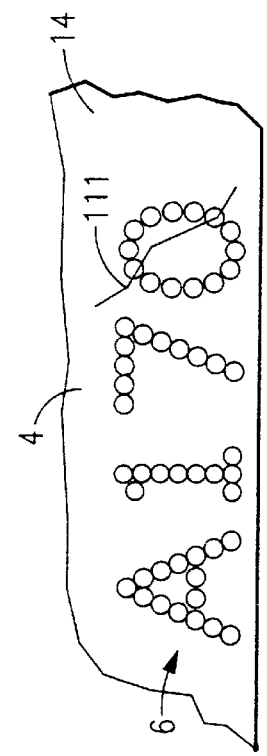
FIG. 1A is a diagrammatic plan view of an alphanumeric string formed in a partially shown semiconductor wafer.

It is to be appreciated that when the system is imaging an alphanumeric character (FIG. 1A), a small scratch 111 is less critical because the scratch is relatively small in comparison to the entire alphanumeric character and thus the character has a very high signal to noise ratio. When imaging soft marks which are on the order of 75 μm in size, the signal to noise ratio is reduced and thus a small scratch can effect accurate imaging by the system.

Another important aspect of the present invention is that the camera 52 can be provided with a zoom lens (e.g. at least a 6:1 zoom) so that the field-of-view of the camera 52 can be altered as desired over a wide range. In particular, it is desirable to have a camera field-of-view at least capable of viewing an area about 4.5 millimeters in height by about 6 millimeters in width, a second area about 17 millimeters in height by about 23 millimeters in width, and a third area about 32 millimeters in height by about 42 millimeters in width. This zoom feature minimizes the need for human interference in the set up process, i.e. selecting and installing different lenses for different size marking indicia which are being standardized by the computer industry. The industry dictates essentially the size of the marks, the code terminology and the location of the matrix code on the surface.

Since certain changes may be made in the above described imaging system and method, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Wherefore, I/we claim:

1. An imaging system for imaging a desired surface of an object to be observed, said imaging system comprising:
    a light source for supplying light to an object to be observed and containing indicia;
    a first lens for focussing the light to be supplied, by said light source, toward the object to be observed;
    a beam splitter being located between said first lens and the object to be observed for allowing a portion of said focussed light to pass therethrough and be supplied to the object to be observed and to receive light reflected by the object to be observed and reflect a portion of the reflected light toward an imaging device;
    a focal plane for focussing a reflected image of the light reflected by the object to be observed and said beam splitter; and
    said imaging device having a light receiving input, located adjacent said focal plane, for receiving only a portion of the light reflected by the object to be imaged while a remaining portion of the light focussing a reflected image of said light source at said focal plane.

2. An imaging system according to claim 1, wherein a second lens is located adjacent said first lens, and said first and second lenses are arranged in an opposed relationship with respect to one another to facilitate focussing of an accurate image of said light source at said focal plane.

3. An imaging system according to claim 1, wherein said light source, said first lens, said beam splitter, the object to be observed and said imaging device define an optical axis of said imaging system; and
    said light source is capable of supplying light along both said optical axis and at an angle with respect to said optical axis.

4. An imaging system according to claim 3, wherein said light source is electrically coupled to a control mechanism for individually controlling each individual illumination element forming said light source, whereby each individual illumination element may be individual turned on and off, as desired, to facilitate supplying light both along the optical axis and at an angle with respect to said optical axis.

5. An imaging system according to claim 1, wherein said light receiving input of said imaging device is one of an entrance pupil and an aperture of said imaging device.

6. An imaging system according to claim 1, wherein said imaging device includes a mechanism for adjusting the field-of-view of said imaging device to facilitate imaging of different sized indicia.

7. An imaging system according to claim 1, wherein at least one mirror is located along the optical path of said imaging system for reflecting light toward said focal plane to facilitate a compact size of said imaging system.

8. An imaging system according to claim 1, wherein said imaging system includes a pair of lenses located in an opposed relationship for focussing the light supplied by said light source;
    a first mirror for reflecting the focussed light from said pair of lenses toward said beam splitter;
    a second mirror for reflecting the focussed light, received from said beam splitter, at said focal plane; and
    a housing for accommodating said light source, said pair of lenses, said first mirror, said second mirror, said beam splitter and at least a portion of said light receiving input of said imaging device, and said housing has at least one aperture therein located along the optical axis for facilitating illumination of the object to be observed, by said imaging system, and preventing illumination interference from the surrounding environment.

9. An imaging system according to claim 8, wherein said light source defines a sagittal plane which extends parallel to a longitudinal axis of said imaging system and any gradient, contained on said object to be imaged, is position, during use of said imaging system, so as to extend in a direction extending parallel to said sagittal plane to minimize imaging interference therefrom.

10. An imaging system according to claim 1, further comprising a computing mechanism which is electrically coupled to said imaging device, and a conveying mechanism which is electrically coupled to said computing mechanism, and said imaging device supplies a sensed image, of the object to be imaged, to said computing mechanism which determines the indicia carried by said object to be observed and outputs a signal to said conveying mechanism to control further manipulation of said object to be observed in view of the determined indicia.

11. A method of imaging an object having at least one soft mark therein, said method comprising the steps of:
    focussing, via a first lens, light supplied from a light source;
    supplying the focussed light to an at least partially reflective surface of said object to be observed which contains said at least one soft mark thereon;
    reflecting said supplied light off said at least partially reflective surface of the object, containing said at least one soft mark, and focussing the reflected light at a focal plane; and
    positioning a light receiving input of an imaging device adjacent said focal plane such that only light which is imperfectly reflected and partially scattered by at least a perimeter area of said at least one soft mark enters said light receiving input and is perceived by said imaging device while a remaining portion of the supplied light is substantially perfectly reflected by said at least partially reflective surfaces and forms an image of said light source at said focal plane.

12. The method of claim 11 further comprising the step of partially forming an imaging system by locating a beam splitter between said first lens and the object to be observed and allowing a portion of said focussed light to pass through said beam splitter and be supplied to the object to be observed and receiving the light reflected by the object to be observed and reflecting a portion of the received reflected light toward said imaging device.

13. The method of claim 12 further comprising the step of defining an optical axis of said imaging system via said light source, said first lens, said beam splitter, the object to be observed and said imaging device; and controlling said light source to supply light at least one of along said optical axis and at an angle with respect to said optical axis.

14. The method of claim 12 further comprising the steps of providing said imaging system with:

a second lens located in an opposed relationship to said first lens to form a pair of lenses for focussing the light supplied by said light source;

a first mirror for reflecting the focussed light from said pair of lenses toward said beam splitter;

a second mirror for reflecting the focussed light, received from said beam splitter, at said focal plane; and accommodating said light source, said pair of lenses, said first mirror, said second mirror, said beam splitter and at least a portion of said light receiving input of said imaging device in a housing, and said housing has at least one aperture therein located along the optical axis for facilitating illumination of the object to be observed, by said imaging system, and preventing illumination interference from the surrounding environment.

15. The method of claim 12 further comprising the step of defining a sagittal plane, with said light source, which extends parallel to a longitudinal axis of said imaging system and, during use of said imaging system, positioning any gradient contained on said object to be imaged so as to extend in a direction extending parallel to said sagittal plane to minimize any imaging interference therefrom.

16. The method of claim 11 further comprising the step of locating a second lens adjacent said first lens, and arranging said first and second lens in an opposed relationship with respect to one another to facilitate focussing of an accurate image of said light source at said focal plane.

17. The method of claim 11 further comprising the step of providing said imaging device with a mechanism for adjusting the field-of-view of said imaging device to facilitate imaging of different sized indicia.

18. The method of claim 11 further comprising the step of electrically coupling said light source to a control mechanism for individually controlling each individual illumination element forming said light source, whereby each individual illumination element may be individually turned on and off, as desired, to facilitate supplying light both along an optical axis and at an angle with respect to said optical axis.

19. The method of claim 11 further comprising the step of electrically coupling a computing mechanism to said imaging device, and electrically coupling a conveying mechanism to said computing mechanism, and supplying a sensed image, of the object to be imaged, from said imaging device to said computing mechanism which determines indicia carried by said object to be observed and outputting a signal to said conveying mechanism to control further manipulation of said object to be observed in view of the determined indicia.

20. The method of claim 11 further comprising the step of using one of an entrance pupil and an aperture of said imaging device as said light receiving input.

* * * * *